(12) United States Patent
Chen et al.

(10) Patent No.: US 11,083,058 B2
(45) Date of Patent: Aug. 3, 2021

(54) LIGHTING DRIVE, LIGHTING SYSTEM AND CONTROL METHOD

(71) Applicant: SIGNIFY HOLDING B.V., Eindhoven (NL)

(72) Inventors: Zhi Quan Chen, Eindhoven (NL); Xianhui Zhang, Eindhoven (NL); Haimin Tao, Eindhoven (NL); Hui Zheng, Eindhoven (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/954,308

(22) PCT Filed: Dec. 21, 2018

(86) PCT No.: PCT/EP2018/086476
§ 371 (c)(1),
(2) Date: Jun. 16, 2020

(87) PCT Pub. No.: WO2019/134852
PCT Pub. Date: Jul. 11, 2019

(65) Prior Publication Data
US 2021/0092808 A1    Mar. 25, 2021

(30) Foreign Application Priority Data

Jan. 2, 2018   (WO) ................ PCT/CN2018/070013
Feb. 9, 2018   (EP) ..................................... 18156089

(51) Int. Cl.
*H05B 45/357*   (2020.01)
*H05B 47/105*   (2020.01)
(Continued)

(52) U.S. Cl.
CPC ........... *H05B 45/14* (2020.01); *H05B 45/357* (2020.01)

(58) Field of Classification Search
CPC .. H05B 45/14; H05B 45/357; H05B 45/3574; H05B 47/10; H05B 47/14; H05B 47/16; H05B 47/105
See application file for complete search history.

(56) References Cited

U.S. PATENT DOCUMENTS

2006/0044845 A1   3/2006   Fahlenkamp et al.
2010/0301827 A1  12/2010   Chen et al.
(Continued)

FOREIGN PATENT DOCUMENTS

| CN | 107251652 A   | 10/2017 |
| EP | 2608636 A1    | 6/2013  |
| WO | 2016150768 A1 | 9/2016  |

*Primary Examiner* — Henry Luong
(74) *Attorney, Agent, or Firm* — Daniel J. Piotrowski

(57) ABSTRACT

A lighting driver is for receiving an alternating current power supply from a fluorescent lighting ballast. A shunt device is provided for selectively shunting the power supply to implement dimming control. A detector is provided for generating a detection signal and for providing the detection signal to the control circuit to operate the shunt device. The detector has a detection circuit for analyzing a voltage at the driver input and generating 5 the detection signal accordingly, when the voltage is detected. In addition, for situations where the voltage detection does not correctly generate the detection signal, a correction circuit generates the detection signal for a time delay from the end of operating the shunt device. This prevents control stability problems at low dimming levels.

15 Claims, 8 Drawing Sheets

(51) Int. Cl.
*H05B 47/16* (2020.01)
*H05B 45/14* (2020.01)

(56) References Cited

U.S. PATENT DOCUMENTS

| | | |
|---|---|---|
| 2012/0153922 A1 | 6/2012 | Chen et al. |
| 2013/0162168 A1 | 6/2013 | Ostrovsky |
| 2013/0200812 A1 | 8/2013 | Radermacher et al. |
| 2013/0221867 A1 | 8/2013 | Deppe et al. |
| 2013/0320869 A1 | 12/2013 | Jans et al. |
| 2014/0320007 A1* | 10/2014 | Stamm ............... H05B 45/37 315/51 |
| 2015/0084535 A1 | 3/2015 | King et al. |
| 2015/0181667 A1 | 6/2015 | Tao et al. |
| 2016/0095179 A1 | 3/2016 | Jang et al. |

\* cited by examiner

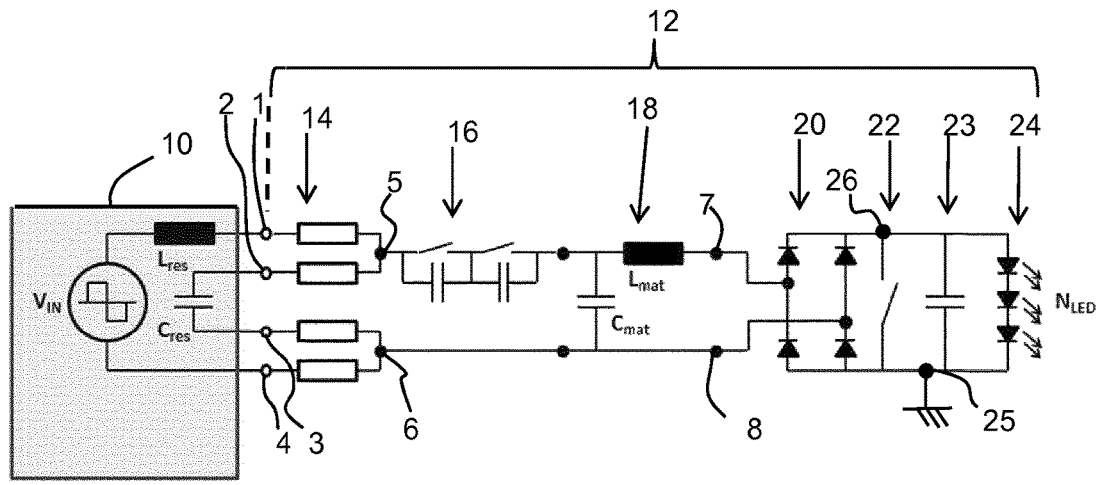
FIG. 1
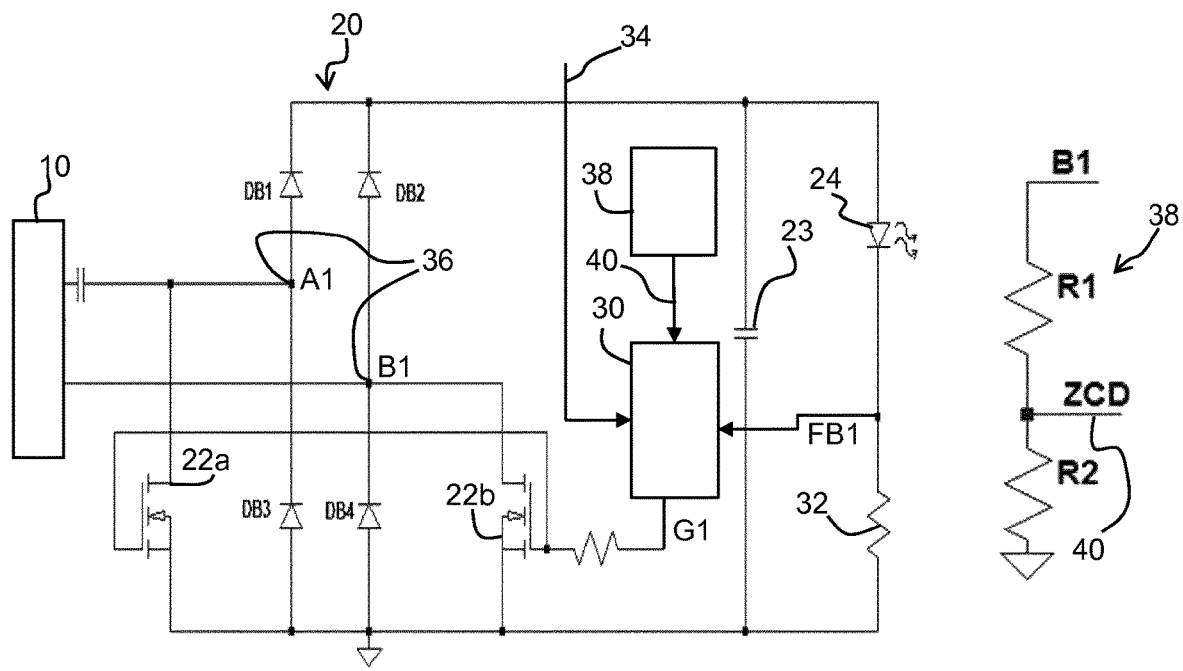
FIG. 2
FIG. 3

LIGHTING DRIVE, LIGHTING SYSTEM AND CONTROL METHOD

CROSS-REFERENCE TO PRIOR APPLICATIONS

This application is the U.S. National Phase application under 35 U.S.C. § 371 of International Application No. PCT/EP2018/086476, filed on Dec. 21, 2018, which claims the benefit of International Patent Application No. PCT/CN2018/070013, filed on Jan. 2, 2018 and European Patent Application No. 18156089.7, filed on Feb. 9, 2018. These applications are hereby incorporated by reference herein.

FIELD OF THE INVENTION

This invention relates to a solid state lighting driver, which is for connection to a fluorescent ballast. The invention further relates to a lighting system and to a method.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with electronic ballasts for fluorescent tube lamps.

There are now tubular LED ("TLED") lamps which can be used as a direct replacement for traditional fluorescent light tubes. In this way, the advantages of solid state lighting can be obtained without the expense of changing existing light fittings. Indeed, TLEDs that are compatible with fluorescent lamp ballasts are the most straightforward and lowest cost way of replacing fluorescent lighting by LED lighting. Both rewiring (removing the ballast, connecting a TLED directly to AC mains) and replacing the whole luminaire are considerably more cumbersome and expensive. Both electromagnetic (EM) and electronic high frequency (HF) ballasts are used in fluorescent lighting.

US20140320007A1 discloses a power converter for interfacing a fluorescent lighting ballast to a light emitting diode lamp, where it comprises a transistor to shunt the DC output current in response to a control signal having a duty cycle generated as a function of a zero crossing. EP2608636A1 discloses extrapolate zero-crossings based on one or more sensed zero-crossings.

FIG. 1 shows a typical block diagram of a TLED that is compatible with a fluorescent ballast.

The ballast 10 comprises a half-bridge parallel resonant converter and it drives an electronic (high frequency) ballast compatible TLED 12.

The ballast 10 and high frequency compatible TLED 12 are connected via the connection pins 1 and 2 at one end of the TLED and via the connection pins 3 and 4 at the other end of the TLED.

A high frequency compatible TLED 12 typically comprises all of the building blocks depicted in FIG. 1. These are a filament emulation unit 14, a pin safety and start-up circuit 16, a matching circuit 18, a rectifier 20, an LED driver 22, a smoothing capacitor 23 and the LED string 24. The LED string 24 extends between an internal ground 25 and a high voltage DC bus 26.

For most of these building blocks, the implementations shown in FIG. 1 are just examples and other implementations of their functions are possible and are also used.

The details of the design of the half-bridge ballast 10 are not shown in FIG. 1. This type of ballast is also just an example and other implementations such as push-pull converters are also possible and in use.

The LED driver shown in FIG. 1 is a shunt switch driver. In this type of driver, a shunt switch 22 performs a shorting function in order to implement dimming control.

In the shunt driver design, the shunt switch is controlled by a controller integrated circuit (not shown) in order to provide a duty cycle which provides a desired light output. This shunt control signal needs to be timed with the frequency of the time-varying input signal (e.g. the mains signal) and for this purpose a mains detection signal is used for timing control. This mains detection signal for example is based on detection of the current flowing from the ballast.

US2013/221867A1 discloses a system in which the shunt period can either start at the zero crossing of the alternating current from the ballast, or end at the zero crossing of the alternating current from the ballast. Therefore, detection of the zero crossing of the alternating current from the ballast is crucial to control the shunt switch.

This invention is based on the recognition of a problem that when the lighting load is driven to a low brightness level (i.e. a low dimming level), such as 10%, for some kinds of ballast the detection of the zero crossing becomes difficult: sometimes the detection signal intermittently disappears. This has a significant impact on the closed loop control and can cause the closed loop go to an unstable status.

It would be desirable for lighting units to be compatible with as many different types of ballast as possible, and therefore it would be desirable to prevent interruption of the detection signal, which forms part of the closed loop control.

SUMMARY OF THE INVENTION

It is a concept of the invention to generate a detection signal for use in controlling a shunt device of a shunt driver by two mechanisms. A first mechanism involves analyzing a voltage at the driver input and generating the detection signal accordingly, when the voltage is detected. A second mechanism involves generating the detection signal autonomously as a correction signal for a time delay from the end of operating the shunt device, even when said driver input voltage is not detected. In this way, the detection signal is generated even if the driver input signal, in particular from a fluorescence lighting ballast, is not received due to the large shunt duration.

The invention is defined by the claims.

According to examples in accordance with an aspect of the invention, there is provided a lighting driver, comprising:
a driver input for receiving an alternating current power supply from a fluorescent lighting ballast;
a shunt device for selectively shunting the power supply;
a controller for operating or not operating the shunt device;
wherein the controller is adapted to operate the shunt device during a portion of the cycle of the alternating current power supply, such that a current is delivered to a lighting load only during the portion of the cycle of the alternating current power supply when the shunt device is not operated; and a detector for generating a detection signal and for providing the detection signal to the controller to operate the shunt device, wherein the detector comprises:

a detection circuit for analyzing a voltage at the driver input and generating the detection signal accordingly, when the voltage is detected; and a correction circuit for generating the detection signal for a time delay from the end of operating the shunt device, even when said voltage is not detected, wherein said correction circuit is adapted to start to time a time constant corresponding to the time delay at the end of operating the shunt device and to generate the detection signal after the time constant expires when said input voltage is not detected.

The controller may for example be used to control the shunt control signal to make sure the light output is at the desired level, based on monitoring of the current through the load. The detection signal is used to enable frequency synchronization between the driver input and the shunt control signal. The detection signal generated by the detection circuit relies on the detection of the voltage at the driver input. However, this voltage detection may be unreliable, so that no detection signal may be generated in case the shunt duration is too long, even when there is a current through the load. This has been found in particular to arise when the shunt device is operable for a large part of the power supply cycle, for example during deep dimming of the lighting load. The correction circuit is used to provide the required detection signal when it is not reliably generated by the ballast. It is generated for a short duration corresponding to the time delay. This duration is selected so that the signal is able to function as a synchronization signal, to mimic the detection signal that is expected to be generated from the detected input voltage. This would avoid asynchronization due to an absence of the detection signal. Compared with EP2608636A1, the lighting driver of the application is not based on previous zero crossing, and does not require complex frequency information, thus is easier and simpler to implement.

The lighting driver may further comprise:

a rectifier having a rectifier input for receiving the driver input and having a rectifier output for driving the lighting load, wherein the shunt device is either:

connected between the rectifier and the lighting load, for selectively shunting the rectifier output; or integrated with the rectifier and for shunting the driver input.

The power supply may thus be shunted at the input or output of a rectifier. This embodiment provides two implementations for the shunt switch. The first implementation is easy to control since the shunt switch is separate from the rectifier, while in the second implementation the shunt device can replace a diode of the rectifier and increase the efficiency of the rectifier. The complexity of the second implementation is that the shunt switch needs to be controlled to achieve both functions of rectification and shunting.

In a further embodiment, the detection circuit may be for: detecting non-zero voltage values and a zero voltage value; and determine a zero crossing of the voltage at the driver input upon a detection of the zero voltage value after the non-zero voltage value, and generating the detection signal when the non-zero voltage values are detected.

Thus, the detection of the voltage at the driver input may be based on zero crossing detection. This enables controlling of the shunt device based on zero crossings. Zero crossing switching is easy to control and has better power efficiency than hard switching.

In a further embodiment, said detection circuit comprises:

a pull on-off circuit adapted to:

pull off the detection signal when the controller operates the shunt device; and pull off the detection signal when the voltage at the driver input is low and pull up the detection signal otherwise, when the controller does not operates the shunt device, and the correction circuit is adapted to disable the pulling off of the pull on-off circuit after the controller stops operating the shunt device, for the time delay.

This embodiment provides a clear circuit logic to derive the zero crossing from the input voltage when the input voltage is present/detected, and to generate the zero crossing autonomously when the input voltage is not present/detected.

In a more specific embodiment, the detection circuit for example comprises an interface circuit to the input voltage, and the pull on-off circuit comprises:

a first pull off transistor associated with the interface circuit, wherein said first pull off transistor is adapted to enable the detection signal to be pulled on when the detected voltage at the driver input is non-zero, and adapted to enable the detection signal to be pulled off when the detected voltage at the driver input is zero.

Note that the terms on and off are for example used to indicate logical high and low signal values respectively. However, equivalently, a logical low signal may correspond to an on signal and a logical high signal may correspond to an off signal.

The first pull off transistor basically controls whether the detection signal is pulled up or down. For example, there may be a pull on resistor associated with the first pull off transistor, so that the resistor pulls the detection signal on when the transistor is not activated, and the transistor pulls the detection signal off when activated. The first pull off transistor is basically a voltage follower to reflect the amplitude of the input voltage, thus when the input voltage is above zero and then crosses zero, the detection signal would be pulled on and pulled off to indicate a zero crossing.

In a further embodiment, the controller is for example adapted to generate a bi-state shunt control signal to control the shunt device, and the pull on-off circuit further comprises:

a second pull off transistor, adapted to be controlled by the shunt control signal so as to pull off the detection signal when the shunt control signal operates the shunt device, and not to pull off the detection signal when the shunt control signal is not operating the shunt device.

There are thus two (the first and the second) pull off transistors which effectively define an OR function. The detection signal is on (e.g. high) unless pulled off (e.g. pulled down) either because there is no voltage detection signal, or because the bi-state shunt control signal is present which means the shunt device is being operated to shunt the ballast output and in turn it is not necessary/meaningful to detect the zero crossing of the ballast output.

The detection signal may for example be pulled down to ground when either of the first and second pull off transistors is turned on.

The correction circuit may be adapted to be controlled by the shunt control signal so as to enable the detection signal to be pulled on when the shunt control signal does not operate the shunt device and hence second pull off transistor is not pulling off the detection signal, for the time delay period.

The correction circuit and the detected voltage thus both control the first pull off transistor. The first pull off transistor pulls the detection signal off unless either the detected voltage is high or else when the timing is within the time delay. Thus the detection signal is pulled on as long as the shunt device is not operated, and a leading edge in the detection signal will be generated; then the detection signal is pulled off after the time delay as long as the input voltage is not present, alternatively, the detection signal is pulled off by the zero crossing of the input voltage if the input voltage is present. Thus, the trailing edge in the detection signal will come definitely, and this trailing edge indicates the zero crossing and controls the shunt switch. Synchronization is obtained no matter whether or not the input voltage is detected.

The first pull off transistor may comprise:
a base terminal connected to a bias voltage and to the interface circuit;
a collector terminal connected to a bias voltage; and
an emitter terminal connected to a reference voltage, and the second pull off transistor may comprise:
a base terminal connected to the shunt control signal;
a collector terminal connected to the collector terminal of the first pull off transistor; and
an emitter terminal connected to the reference voltage.

Thus, bipolar junction transistors are used to implement the two alternative pull off functions.

The interface circuit for example comprises:
a control transistor which is turned on by a voltage at the driver input and which pulls off the bias voltage at the base terminal of the first pull off transistor when the control transistor is turned on.

By "pulling off a bias voltage" is meant setting the bias voltage to a level which turns off the transistor.

Thus, when there is a driver input voltage signal, the first pull off transistor is turned off so that the detection signal is pulled on (as long as the second pull off transistor is also off).

The correction circuit for example comprises:
a delay circuit for:
pulling off the bias voltage at the base terminal of the first pull off transistor when the shunt control signal does operate and up to said time delay after the end of the operation of the shunt control signal; and
allowing the bias voltage at the base terminal of the first pull off transistor to be pulled on after said time delay after the end of operating state of the shunt control signal.

When the bias voltage is pulled off, this means the first pull off transistor is turned off, so that the second pull off transistor determines the detection signal value. Thus, during the operation of the shunt control signal, and for the initial delay period, it is only the second pull off transistor that can pull down the detection signal. Thus it always becomes high during the delay period while the shunt control signal has stopped operating. If the input voltage is present, it will take over the control of the bias voltage and of the detection signal: keeping it high and allowing it to drop the moment the input voltage drops; otherwise the delay circuit allows the detection signal to drop: meaning the zero crossing is expected to occur at this moment. In this way, the correction circuit kicks in for a fixed delay time to compensate for any failed generation of the detection signal based on the detected voltage. Since the shunt duration is already long enough to reach the zero crossing, which results in that the input voltage cannot be detected, this is a close mimic to the real zero crossing. For example the delay circuit is designed to provide a delay of a constant duration of 300 ns. Note other alternatives exist.

The delay circuit may comprise a transistor with an RC circuit connected to the shunt control signal, for allowing the bias voltage at the base terminal of the first pull off transistor to be pulled on only after said time delay.

In an embodiment, the controller may further comprise:
a dimming interface for receiving a dimming level;
and said controller is adapted to control a length of a duration of operating the shunt device according to said dimming level.

This embodiment defines how the shunt device is controlled to provide a desired dimming effect.

In this case, the controller may further comprise:
a feedback loop to detect the current going to the lighting load and to control the length of the duration of operating the shunt device according to said diming level and said detected current.

This embodiment defines a closed loop control to control the shunt device.

the driver input is for receiving a power supply from an electronic high frequency fluorescent lighting ballast.

This embodiment defines a typical application of this aspect of the invention.

The invention also provides a lighting device comprising:
a lighting driver as defined above; and
an LED lighting load to be driven by said lighting driver.

This aspect provides a lighting device comprising the above mentioned driver and LED.

The lighting load is for example a tubular LED lamp.

This aspect provides a typical application of this aspect of the invention.

The invention also provides a method of controlling a lighting load, comprising:
receiving an alternating current power supply from a fluorescent lighting ballast;
controlling a shunt device for selectively shunting the power supply thereby to implement dimming control, by operating the shunt device and not operating the shunt device;
operating the shunt device during a portion of the cycle of the alternating current power supply, such that a current is delivered to the load only during the portion of the cycle of the alternating current power supply when the shunt device is not operated; and
generating a detection signal and providing the detection feedback signal to the controller to start to operate the shunt device,
wherein the method further comprises:
analyzing a voltage at the driver input and generating the detection signal accordingly, when the voltage is detected; and
generating the detection signal for a time delay from the end of operating the shunt device even when said voltage is not detected, comprising starting to time a time constant corresponding to the time delay at the end of operating the shunt device and generating the detection signal after the time constant expires when said input voltage is not detected.

Another aspect of the invention is for reducing the noise of the power supply, especially in standby mode. Intelligent driver is more and more popular, because it supports wireless control, sensor integration, so more and more functions are integrated into Smart TLED. Normally, when Smart TLED goes into standby status, hysteresis control is used to control the shunt switch to provide a standby supply voltage. As shown in FIG. 10, the voltage on the capacitor 22 in FIG. 1 is regulated between a maximum value V2 and a minimum value V1 to provide a supply voltage, and both of the two values are smaller than the forward voltage of the LED 24 so the LED 24 would not emit light (namely standby). The capacitor 22 is charged from time instant T1 to T2 when the shunt device is open and the voltage on the capacitor 22 is increased linearly, and the voltage decreases linearly from time instant T2 to T3 when the shunt device is close and the power consumption devices in standby draw energy from the capacitor 22. The shunt switch frequency is 1/(T3−T1) and is dependent on the voltage range of hysteresis control, the ballast output capability and power consumption for the device that are still operating in the standby mode: the MCU, sensors, wireless communication modules and so on. Even further, the power consumption is not very stable as the sensors and wireless communication modules may operate in burst manner. Sometime the shunt switch frequency is below 22 kHz, and this will introduced audible noise. US2010301827 is a prior art but does not cope with audible noise.

In order to solve this problem, another aspect of the invention proposes to flexibly adjust the range of the hysteresis control so as to control the switching frequency of the shunt device, outside the frequency range of the audible sound/noise.

Another aspect of the invention provides a lighting driver, comprising:

a driver input for receiving an alternating current power supply from a fluorescent lighting ballast;

a driver output;

a shunt device for selectively shunting the power supply;

a controller for operating the shunt device thereby preventing the power supply from reaching the driver output or not operating the shunt device thereby allowing the power supply to be delivered at the driver output, the controller comprising:

a voltage detector to detect a voltage at the driver output; and a hysteresis control element adapted to operate the shunt device when the voltage at the driver output reaches a first threshold and not operate the shunt device when the voltage at the driver output reaches a second threshold lower than the first threshold; the driver further comprising:

a tuning circuit to tune at least one of the first threshold and the second threshold so as tune the switching frequency of the shunt device outside a frequency range of human-audible sound or in a less-sensitive frequency in the frequency range of human-audible sound.

In this aspect, the voltage range of the hysteresis control can be tuned so as to change the switching frequency of the shunt device outside a frequency range of human-audible sound, thus the driver would not likely to generate human-audible noise. Alternatively, the frequency can be tuned in a less-sensitive frequency in the frequency range of human-audible sound, thus it is more user-friendly.

In a further embodiment of this aspect, the controller further comprising a frequency detector to detect the switching frequency of the shunt device, and the tuning circuit is adapted to tune the at least one of the first threshold and the second threshold when the detected switching frequency falls in the frequency range of human-audible sound.

This embodiment provides a close loop control in reducing the noise: if noise is detected, the hysteresis control is tuned to reduce the noise.

In an alternative embodiment, a feedforward open loop control can be used. More specifically, the controller comprises an interface connected to the power consumption device, preferably those operate in standby mode, and receive information indicative of how the power consumption device is to operate, and the controller is adapted to tune the at least one of the first threshold and the second threshold according to the information.

In this embodiment, how the hysteresis control should be controlled for different situations of the power consumption device can be pre-stored, and the tuning circuit can tune the hysteresis control according to the incoming situation of the power consumption device. This saves the cost of the frequency detector in the former embodiment, and is cheaper.

In a further embodiment, the controller is further adapted to tune the at least one of the first threshold and the second threshold according to an output characteristic of the ballast. This is a further feedforward solution that considers the input characteristic of the driver so as to make corresponding tuning in the hysteresis control.

In an embodiment, the controller is adapted to operate the shunt device for a duration which is a plurality of the periods of the alternating current power supply from the fluorescent lighting ballast, and the controller is adapted to not operate the shunt device for a duration which is a plurality of the periods of the alternating current power supply.

In this embodiment, the shunt device does not switch in every half cycle of the ballast's output, but extends across many half cycles. This reduces the switching loss in standby.

In a preferred embodiment, the tuning circuit is to tune at least one of the first threshold and the second threshold so as tune the switching frequency of the shunt device higher than 20K Hz which is a frequency range of human-audible sound, or in less than 1K or in 10K to 20K Hz which is a less-sensitive frequency in the frequency range of human-audible sound.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which:

FIG. 1 shows a known high frequency compatible TLED;

FIG. 2 shows the known shunt driver configuration in more detail;

FIG. 3 shows a known example of the detection circuit used in the circuit of FIG. 2;

FIG. 12 shows tuning the hysteresis control according to another aspect of the invention; and.

DETAILED DESCRIPTION OF THE EMBODIMENTS

Figure 4:
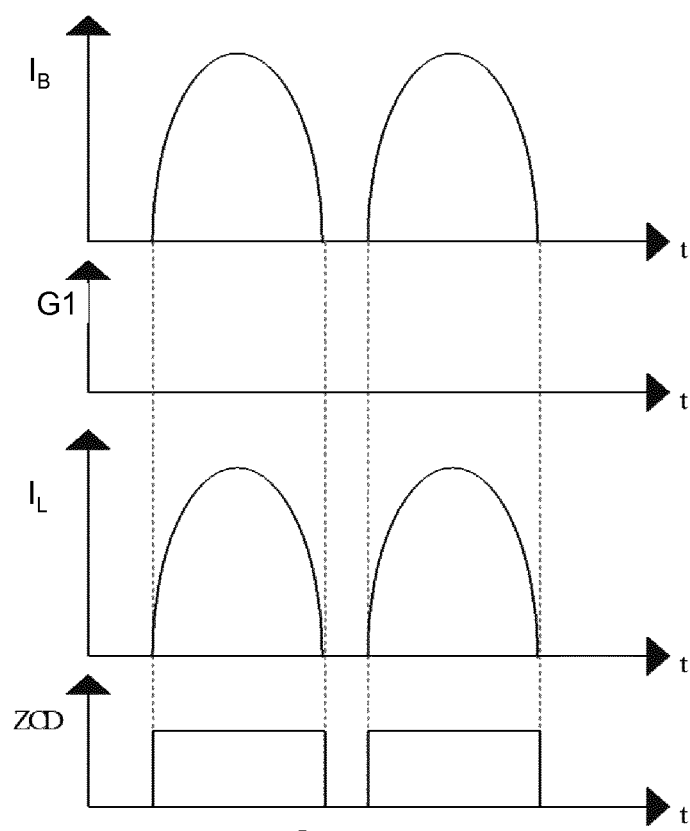
FIG. 4 shows timing diagrams to explain the operation of the circuit of FIGS. 2 and 3 at full brightness.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting driver for receiving an alternating current power supply from a fluorescent lighting ballast. A shunt device is provided for selectively shunting the power supply to implement dimming control. A detector is provided for generating a detection signal and for providing the detection signal to the control circuit to operate the shunt device. The detector has a detection circuit for analyzing a voltage at the driver input and generating the detection signal accordingly, when the voltage is detected. In addition, for situations where the voltage detection does not correctly generate the detection signal, a correction circuit generates the detection signal for a time delay from the end of operating the shunt device. This provides necessary timing for the shunt device and prevents control stability problems at low dimming levels.

FIG. 2 shows the known shunt driver configuration in more detail. For simplicity, only the ballast 10, rectifier 20 (formed of diode bridge diodes DB1 to DB4), output capacitor 23, LED lighting load 24 and shunt device 22a and 22b, which are essentially similar to the shunt device 22 of FIG. 1, are shown.

The shunt device is implemented as two transistors 22a, 22b which together short together the rectifier input in this example, instead of the rectifier output as shown in FIG. 1. Even further, the two transistor 22a and 22b can replace some diodes when the two transistors can also be controlled as a rectifying element. Such implementation is known as a bridgeless implementation. Thus, the shunt device is either connected between the rectifier and the lighting load (FIG. 1) for selectively shunting the rectifier output, or integrated with the rectifier and for shunting the driver input (FIG. 2).

The transistors are controlled by a shunt control signal G1 which is provided by a controller integrated circuit 30. The shunt control signal G1 is a bi-state shunt control signal. The controller 30 receives a feedback signal FB from a current sense resistor 32, and also receives a dimming command 34 which is for example received wirelessly from a remote controller. It then operates the shunt device transistors 22a, 22b to prevent current reaching the LED load or else does not operate the shunt device transistors to allow the LED load to be driven, such that an energy goes to the LED load which is regulated to provide a dimming effect corresponding to the dimming command 34.

Thus, to achieve a closed loop control, resistor 32 implements a feedback loop to detect the current going to the lighting load and to control the length of the duration of operating the shunt device according to said diming level and said detected current.

The lighting driver comprises a driver input 36 for receiving an alternating current power supply from the ballast 10. The controller 30 operates the shunt device during a portion of the cycle of the alternating current power supply, such that a current is delivered to the LED load only during the portion of the cycle of the alternating current power supply when the shunt device is not operated.

The driver also has a detector 38 for generating a detection signal 40 and for providing the detection signal to the controller 30 to operate the shunt device. This detection signal 40 is timed with the frequency of the AC input signal and is used to implement cycle by cycle control so that the shunt device frequency tracks the ballast frequency. More specifically, the shunt switch is operated in accordance with zero crossing of the AC input (current) signal to implement soft switching.

The controller 30 also has a dimming interface for receiving the dimming level 34. The controller 30 controls a length of a duration of operating the shunt device according to said dimming level.

FIG. 3 shows a known example of the detection circuit 38 to generate the detection signal 40 in the form of a zero crossing detection signal ("ZCD"). The circuit comprises a resistive divider R1, R2 between one of the rectifier inputs (B1) and ground. When the load is connected to the ballast, the voltage at this point is a square wave signal, and the resistive divider generates a lower voltage version.

FIG. 4 shows timing diagrams to explain the operation of the circuit of FIGS. 2 and 3 at full brightness.

The top plot shows the current $I_B$ delivered by the ballast, the second plot shows the shunt control signal G1, the third plot shows the current IL supplied to the LED load and the bottom plot shows the detection signal ZCD.

There is no shunt control signal because there is no shunting needed. The current is supplied to the load at all times. The ZCD signal is in phase with the un-shunted input current. It has a leading edge from zero to a high value, and a trailing edge from the high value to zero. The trailing edge is at the same time as the zero crossing thus the driver knows the timing of an end of this half cycle and a start of a next half cycle.

Figure 5:
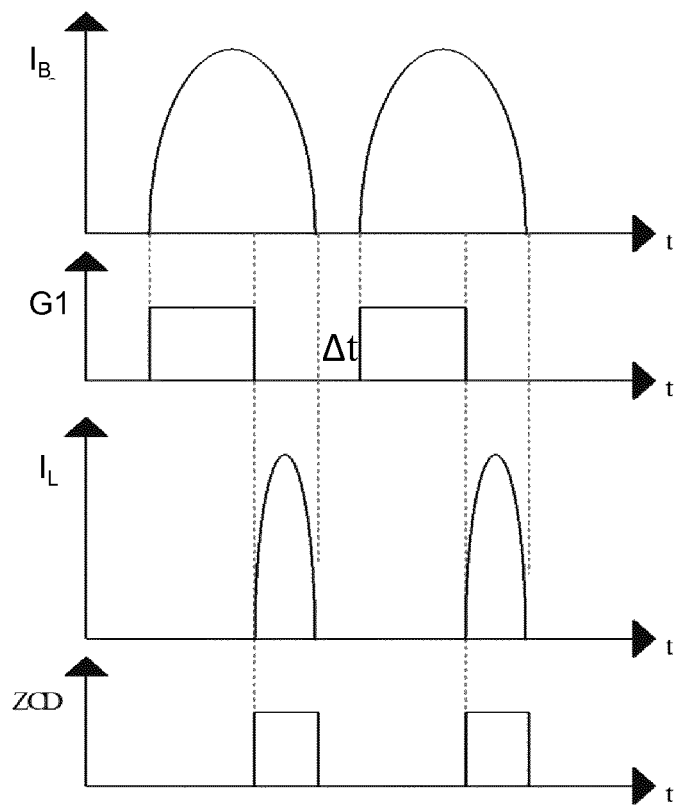
FIG. 5 shows timing diagrams to explain the operation of the circuit of FIGS. 2 and 3 at a dimmed brightness level.

FIG. 5 shows timing diagrams to explain the operation of the circuit of FIGS. 2 and 3 at a dimmed brightness level.

Again, the top plot shows the current $I_B$ delivered by the ballast, the second plot shows the shunt control signal G1, the third plot shows the current IL supplied to the LED load and the bottom plot shows the detection signal ZCD.

The shunt control signal causes part of the current waveform not to pass to the load. The detection signal is hence shorter, since it only arises when there is a load current and hence voltage. Triggered by the trailing edge of the detection signal ZCD, the driver knows an end of this half cycle and a start of a next half cycle, and the shunt device will be operated again almost immediately, though the drawing shows a small time offset Δt between them.

The ballast current passes through the shunt device during shunt switching.

Figure 6:
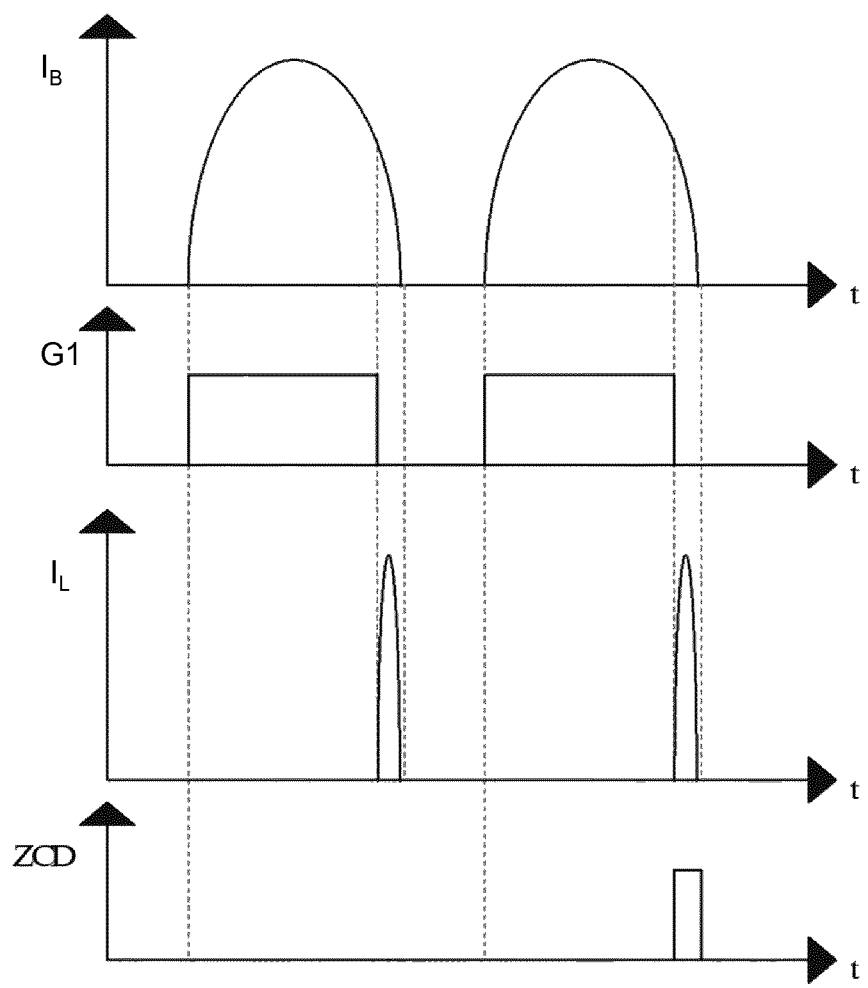
FIG. 6 shows timing diagrams to explain the operation of the circuit of FIGS. 2 and 3 at a low brightness and hence low dimming level.

FIG. 6 shows timing diagrams to explain the operation of the circuit of FIGS. 2 and 3 at a low brightness and hence low dimming level.

Again, the top plot shows the current $I_B$ delivered by the ballast, the second plot shows the shunt control signal G1, the third plot shows the current IL supplied to the LED load and the bottom plot shows the detection signal ZCD.

The detection signal ZCD is even shorter, and as shown, detection pulses may be missed. This may for example arise at dimming levels of 10% or lower. This presents loop stability issues.

This issue arises because of the working principle of the ballast. The ballast does not actively control its output voltage (at nodes A1 or B1). There is typically a self-oscillation circuit inside the ballast, and when a fluorescent lamp is operating, the output voltage follows the output current because the lamp is a linear load. For a non-linear load such as an LED string, the voltage does not follow the current. With a long shunt time, the self-oscillation circuit needs a restart time after several cycles. When the self-oscillation circuit restarts, the output voltage will be very low or zero, and the detection signal may be missed in this period. Thus, there is no ZCD leading edge or trailing edge associated with the first zero crossing. The input voltage and the ZCD may be detected in another half cycle. Thus the operation is not stable.

Figure 7:
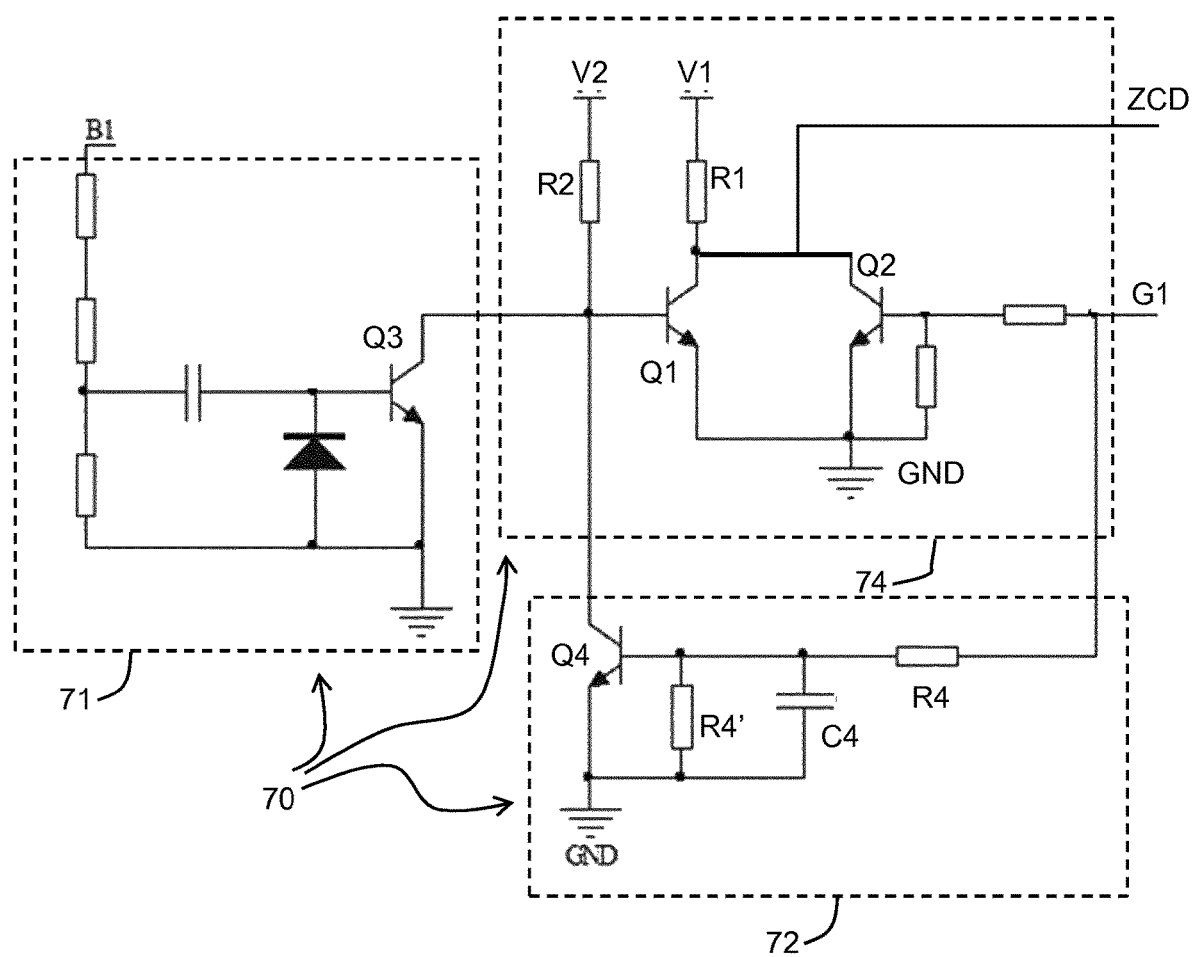
FIG. 7 shows a detector for solving the problem illustrated in FIG. 6, to replace the simple resistive divider circuit of FIG. 3.

FIG. 7 shows a detector for solving the problem, to replace the simple resistive divider circuit of FIG. 3.

The detector 70 has two main parts; a detection circuit 71 and 74, and a correction circuit 72. Further the detection circuit comprises an interface circuit 71 to the input voltage and a pull on-off circuit 74.

The detection circuit 71 and 74 is for analyzing a voltage at the driver input B1 (it could equivalently be input A1) and generating the detection signal ZCD accordingly, when the voltage is detected.

The correction circuit 72 is for generating the detection signal ZCD for a time delay from the end of operating the shunt device, even when the voltage is not detected by the detection circuit 71 and 74.

The detection circuit 71 and 74 detects non-zero voltage values at the input B1 and detects a zero voltage value. When a zero value is detected after non-zero values, this is indicative of a zero crossing of the voltage at the driver input. The detection signal ZCD is high when the non-zero voltage values are detected i.e. when there is a current to the load.

The pull on-off circuit 74 is for pulling on or off the detection signal ZCD according to the shunt control signal as well as the input voltage, determined by a control logic. There is a first pull off transistor Q1 associated with the interface circuit 71 wherein the first pull off transistor Q1 allows the detection signal to be pulled on when the detected voltage at the driver input is non-zero, and pulls off the detection signal when the detected voltage at the driver input is zero. This makes the detection signal follows the input voltage so the zero crossing of the input voltage can be derived.

Note that the terms on and off are for example used to indicate logical high and low signal values respectively. However, equivalently, a logical low signal may correspond to an on signal and a logical high signal may correspond to an off signal.

In the example shown, a npn transistors are shown, which are pulled on by a high base voltage and pulled off by a low base voltage. For ease of understanding, references will now be made to "pull up" transistors which create a high output when turned on and "pull down" transistors which create a low output when turned on.

The transistor Q1 is thus a pull down transistor which pulls the detection signal low when turned on. The first pull down transistor Q1 has a pull up resistor R1 from its collector to a first bias voltage V1, so that the resistor pulls the detection signal ZCD up when the transistor is not activated, and the transistor pulls the detection signal ZCD down when activated.

The first pull down transistor Q1 has a base terminal connected to another bias voltage V2 through a resistor R2 and to the interface circuit 71 and an emitter terminal connected to a reference voltage which is ground in this example. Note the bias voltages V1 and V2 could be the same.

The interface circuit 71 comprises a control transistor Q3 which is turned on by a voltage at the driver input B1 and which pulls down the bias voltage at the base terminal of the first pull down transistor Q1 when the control transistor Q3 is turned on. Thus, when there is a driver input voltage signal, the first pull down transistor Q1 is turned off so that the detection signal is able to be pulled high to bias voltage V1. In essence, the detection signal ZCD follows the driver input voltage which is determined by the shunt switch.

The pull on-off circuit 74 has a second pull down transistor Q2 (again, it may more generally be considered to be a pull off transistor) controlled by the shunt control signal G1 so as to pull down the detection signal ZCD when the shunt control signal operates the shunt device. The second pull down transistor Q2 does not pull down the detection signal when the shunt control signal is not operating the shunt device. In such a case, the detection signal can be pulled up to the bias V1 as long as the transistor Q1 allows this.

The second pull down transistor Q2 comprises a base terminal connected to the shunt control signal G1, a collector terminal connected to the collector terminal of the first pull down transistor Q1 and an emitter terminal connected to the ground reference voltage.

There are thus two parallel pull down transistors Q1, Q2 which effectively define an OR function. The detection signal ZCD is on (high) unless pulled down either because there is no voltage detection signal or because the bi-state shunt control signal G1 is present. The detection signal is pulled down to ground when either of the first and second pull down transistors is turned on.

The correction circuit 72 is also controlled by the shunt control signal G1 and it disables the pulling off function of the transistor Q1 and causes the detection signal ZCD to be pulled on as a correction function. This correction takes place when the shunt control signal is not operating the shunt device, since during this time the second pull down transistor Q2 is not pulling off the detection signal. Thus, it remains possible to pull the detection signal high. The correction last for a time delay and it means that even if the detection circuit 71 and 74 is not correctly causing Q1 to be turned off due to an absence of the input voltage, Q1 is turned off as a correction function.

The correction circuit 72 and the detection circuit 71 and 74 thus both control the first pull down transistor Q1, again as an OR function. If there is voltage detection or else during the correction time period, the first pull down transistor Q1 is turned off. The correction circuit comprises a delay circuit R4, C4, R4' for controlling the switching of a transistor Q4. This transistor can pull down the base of the first pull down transistor Q1 and hence turn it off The high shunt control signal G1 charges the capacitor C4 through resistor R4 and when charged to the high voltage level of G1, the transistor Q4 is turned on. Thus, it is turned on while G1 is high. When G1 goes low (i.e. the shunt control has ended), Q4 initially remains turned on because a base voltage is stored on C4. This maintains transistor Q1 turned off and hence the detection signal ZCD is pulled up to V1. The base voltage on Q4 declines based on the RC time constant, so that after a delay it turns off. At this time, the state of Q1 depends only on its base voltage which is V2 and is high. Thus Q1 becomes on and the detection signal ZCD becomes low.

Thus, there is a high ZCD pulse generated regardless of whether the voltage detection circuit detects a voltage. This pulse ensures the frequency of pulses of the ZCD detection signal remains synchronized with the input voltage.

The RC time constant is for example in the range 30 ns to 300 ns. The ballast working frequency is from 33 kHz to 65 kHz, so when the signal G1 initially goes low, C4 is fully charged.

Figure 8:
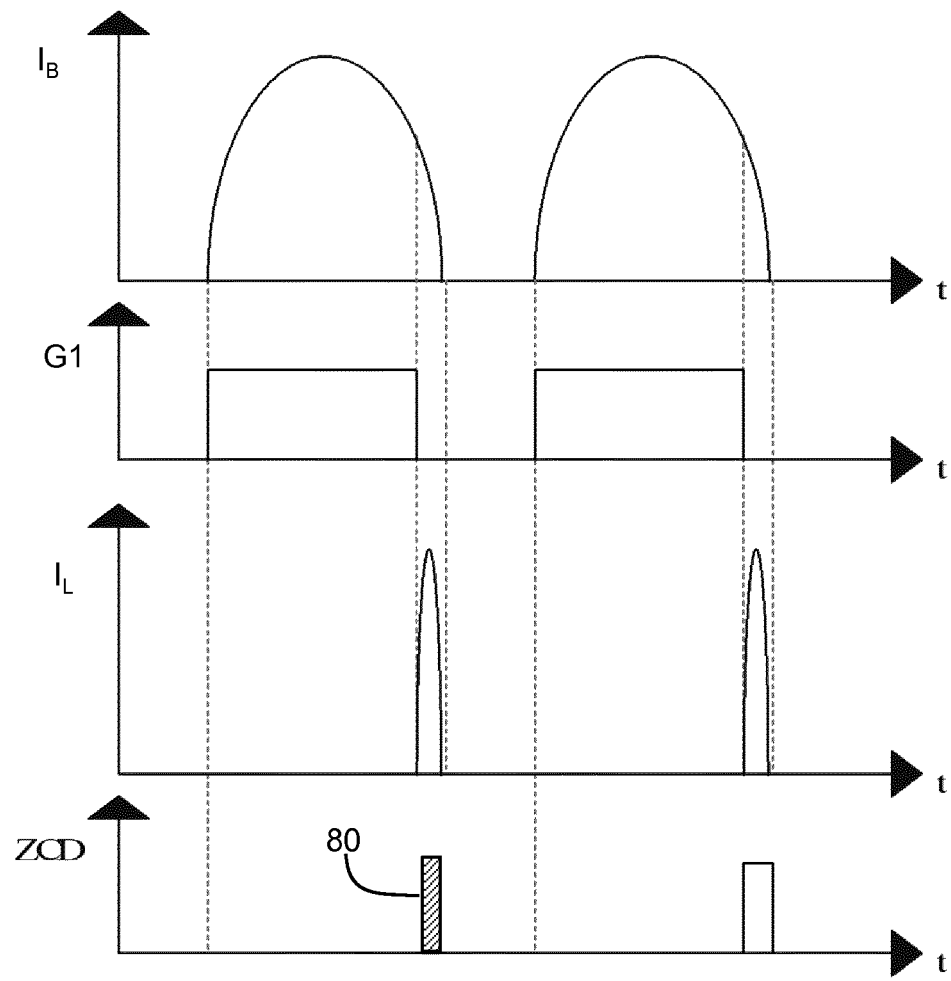
FIG. 8 shows the effect of the invention on the signals shown in FIG. 6.

FIG. 8 shows the effect of the invention on the signals shown in FIG. 6. As shown, the missing detection pulse is generated by the correction circuit. The corrected pulse 80 enables timing control to be maintained. It has a duration which depends on the RC time constant rather than directly on the duration of the IL pulse, but it only serves as a timing reference, so the pulse duration is not important.

Figure 9:
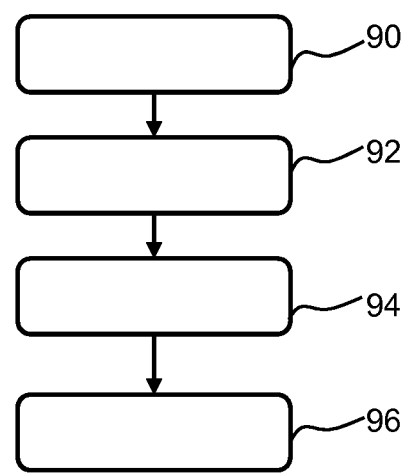
FIG. 9 shows a method of controlling a lighting load.

FIG. 9 shows a method of controlling a lighting load, comprising:

in step 90, receiving an alternating current power supply from a fluorescent lighting ballast;

in step 92, controlling a shunt device for selectively shunting the power supply thereby to implement dimming control, by operating the shunt device and not operating the shunt device;

in step 94 operating the shunt device during a portion of the cycle of the alternating current power supply, such that a current is delivered to the load only during the portion of the cycle of the alternating current power supply when the shunt device is not operated; and in step 96, generating a detection signal and providing the detection feedback signal to the controller to start to operate the shunt device.

The method comprises analyzing a voltage at the driver input and generating the detection signal accordingly, when the voltage is detected; and generating the detection signal for a time delay from the end of operating the shunt device even when said voltage is not detected.

One circuit example has been presented above. However, it will be understood that the same circuit functionality may be achieved with other circuit designs, for example using pull up instead of pull down functions. The core concept is to use the shunt control signal G1 to generate pulses when these may be missing from the detection mechanism. Using the shunt control signal G1 means that there is no feedback. However, this is only carried out for missing feedback pulses, so there is a very limited negative affect on the control loop. As soon as there are real feedback signals, the control loop will adjust correctly again. It means that missing detection pulses, e.g. during deep dimming, can be tolerated.

In another aspect of the invention, still by referring the FIGS. 1 and 2, it is proposed a lighting driver, comprising a driver input 1 to 4 for receiving an alternating current power supply from a fluorescent lighting ballast 10;

a driver output at the capacitor 23;

a shunt device 22 for selectively shunting the power supply;

a controller 30 for operating the shunt device thereby preventing the power supply from reaching the driver output or not operating the shunt device thereby allowing the power supply to be delivered at the driver output, the controller comprising:

a voltage detector to detect a voltage at the driver output; and a hysteresis control element adapted to operate the shunt device when the voltage at the driver output reaches a first threshold V2 and not operate the shunt device when the voltage at the driver output reaches a second threshold V1 lower than the first threshold V2;

the driver further comprising:

a tuning circuit to tune at least one of the first threshold V2 and the second threshold V1 so as tune the switching frequency of the shunt device 22 outside a frequency range of human-audible sound or in a less-sensitive frequency in the frequency range of human-audible sound.

Figure 10:
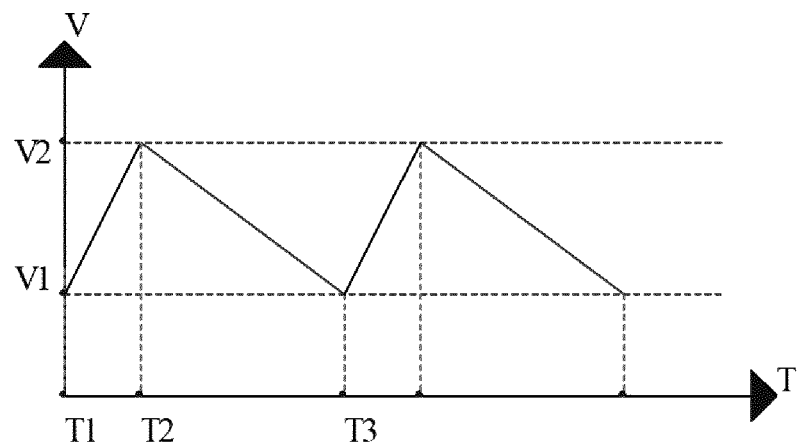
FIG. 10 shows the voltage at the driver output under a hysteresis control.
Figure 11:
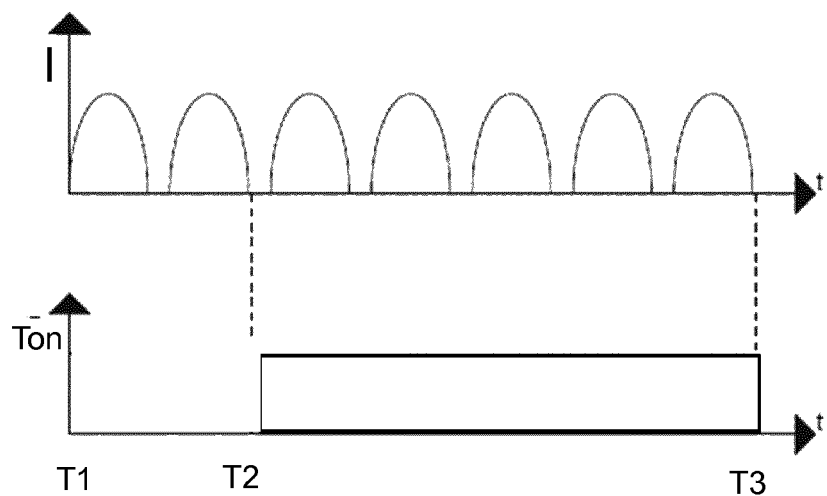
FIG. 11 shows the ballast output and the shunt device's non-operation and operation.

As shown in FIGS. 10 and 11, the ballast output current I is not shunted and the ballast output energy goes to the driver output at the capacitor 23 when the shunt device is not operated, also indicated by the logic low in Ton. The energy charges the capacitor 23 and the voltage increase from V1 to V2. As long as the voltage reach V2, meaning there is enough energy for the power consumption device such as MCU, sensor, wireless communication modules, the shunt device 22 starts to operate and the ballast output current I is shunted, also indicated by the logic high in Ton. As the power consumption device consumes power at the capacitor 23, the voltage on the driver output decreases until it reach V1, meaning there is not sufficient energy for the power consumption device. The controller stops from operating the shunt device. So it repeats.

In a preferred embodiment, as shown in FIG. 11, the controller is adapted to operate the shunt device for a duration from T2 to T3 which is a plurality of the periods of the alternating current power supply I from the fluorescent lighting ballast, and the controller is adapted to not operate the shunt device for a duration which is a plurality of the periods of the alternating current power supply I.

The switching frequency of the shunt device can be calculated as 1/(T3−T1), or 1/T3 if T1 is taken as zero. Thus it is possible that the switching frequency falls in the range of human-audible sound which range is about 20 to 20K Hz.

Figure 12:
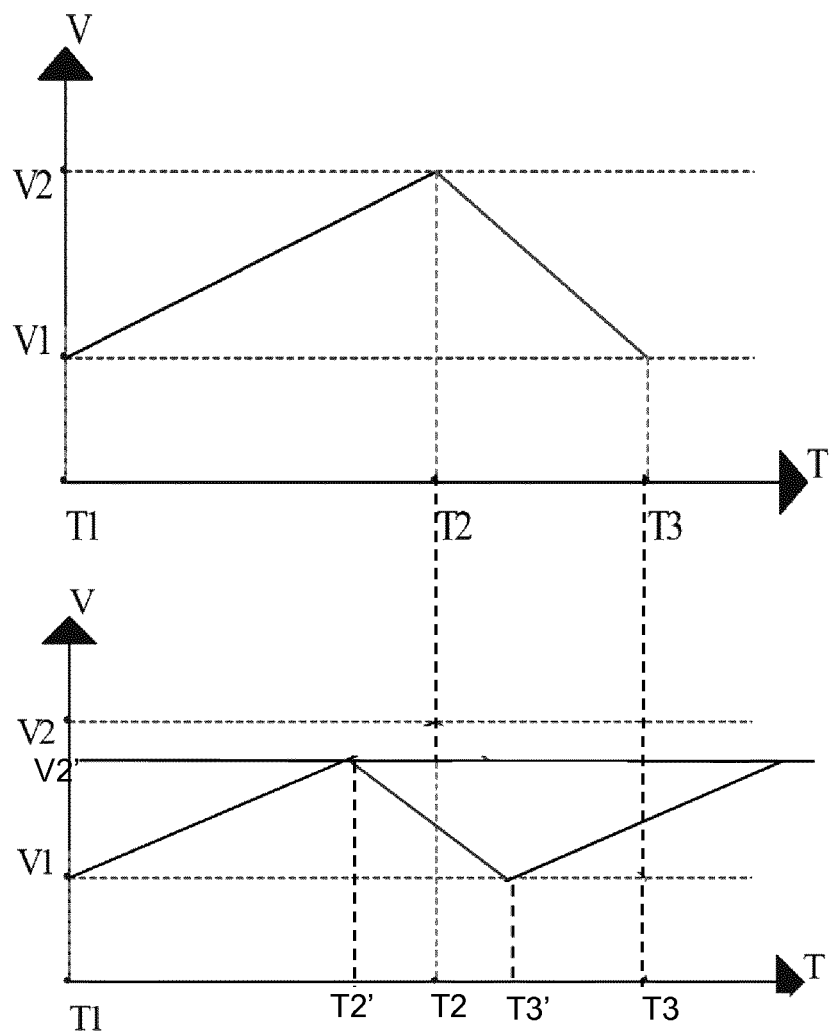

The embodiments of the invention proposes that the voltage range of the hysteresis control can be tuned so as to change the switching frequency of the shunt device outside a frequency range of human-audible sound, thus the driver would not likely to generate human-audible noise. Alternatively, the frequency can be tuned in a less-sensitive frequency in the frequency range of human-audible sound, thus it is more user-friendly. As shown in FIG. 12, the upper hysteresis control has a switching frequency of 1/(T3−T1), or 1/T3 if T1 is taken as zero. Let's assume it falls in the audible range. The embodiments reduces the voltage range by reducing the first threshold from V2 to V2'. Given the ballast output and the power consumption device are not changed, the slope of charging and discharging the capacitor 22 do not change, both charging duration T2'−T1' and discharging duration T3'−T2' between voltage V1 and V2' are reduced with respect those for the original first threshold V2. Thus the switching frequency of the shunt device is increased. By selecting a proper first threshold V2, the switching frequency can be increased above 20K Hz. Additionally or alternatively, the second threshold V1 can also be increased to achieve the similar effect. Note that the voltage range should meet the requirement of the power consumption devices.

Alternatively, if the switching frequency of the shunt device can not effectively be increased above 20K Hz, the voltage range can be tuned to move the switching frequency in a less sensible range in the human-audible frequency range. Research shows that human is more sensitive to the frequency from 1K to 10K Hz. Thus this aspect of the invention can move the switching frequency out of this range, namely below 1K, or 10K to 20 K Hz.

After introducing the principle of this aspect, the following part will describe some implementations.

In a close loop implementations, the controller further comprising a frequency detector to detect the switching frequency of the shunt device, and the tuning circuit is adapted to tune the at least one of the first threshold and the second threshold when the detected switching frequency falls in the frequency range of human-audible sound. This embodiment provides a close loop control in reducing the noise: if noise is detected, the hysteresis control is tuned to reduce it. Alternatively, an audio sensor can be used to detect the noise directly.

In an open loop implementation, a feedforward control can be used. More specifically, the controller comprises an interface connected to the power consumption devices, preferably those operate in standby mode, and to receive information indicative of how the power consumption device is to operate, and the controller is adapted to tune the at least one of the first threshold and the second threshold according to the information.

In this embodiment, how the hysteresis control should be controlled for different situations of the power consumption device can be pre-stored, and the tuning circuit can tune the hysteresis control according to the incoming situation of the power consumption device. This saves the cost of the frequency detector in the former embodiment, and is more cheap.

Figure 13:
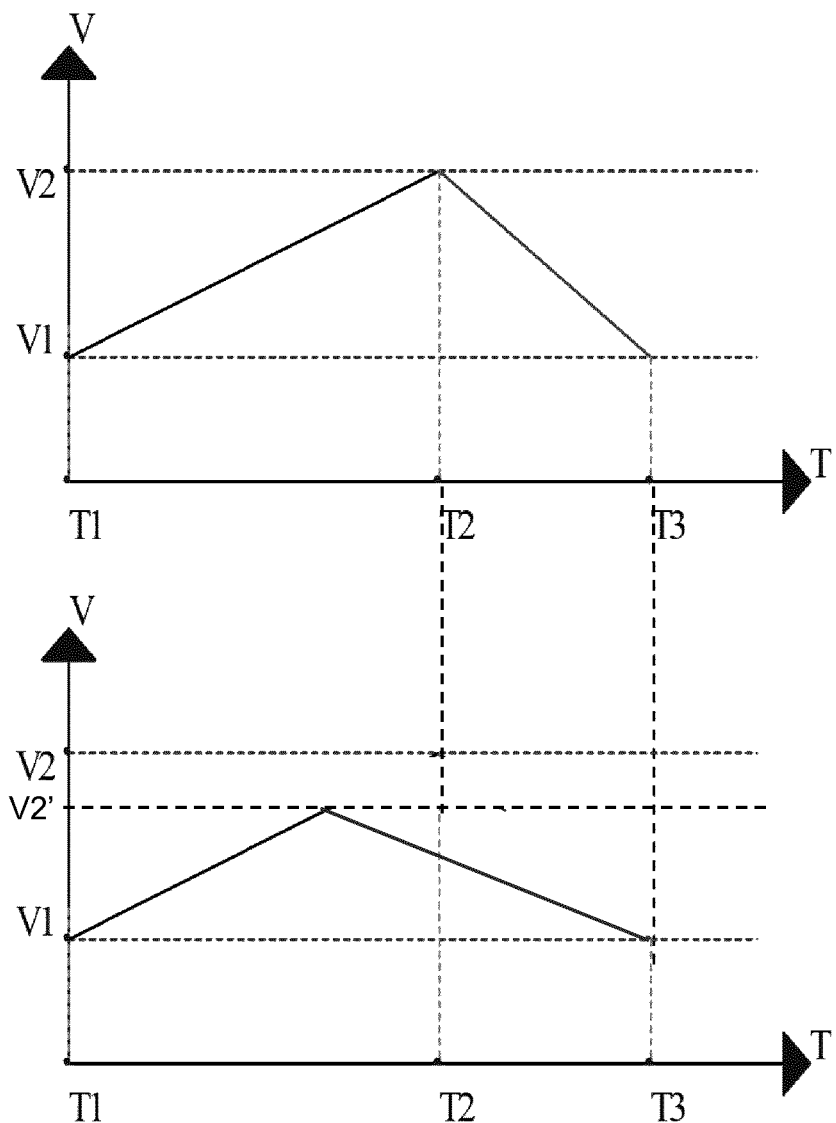
FIG. 13 shows tuning the hysteresis control according to another aspect of the invention.

For example, how the power consumption device operates would influence the discharging duration, in turn the switching frequency. If this information is known, the voltage range can be tuned in synchronization to keep the switching frequency in optimum range. For example, as shown in FIG. 13, the upper drawing shows the control in one state of the power consumption devices, and in this state the power consumption devices are more power consuming. For example, the sensors are sensing and the wireless communication module is transmitting. After a few while, the power consumption devices will become less power consuming due to that the wireless communication module is receiving or is sleeping. The slope in the discharging duration will decrease and the discharging duration will increase if the voltage range is not tuned. The switching frequency would be decreased and may fall in audible range. The aspect reduces the first threshold V2 to V2' such that the charging duration is also reduced and the total duration/switching frequency is still the same. Thus the switching frequency is still out of the audible range. Note the ballast output is considered constant thus the slope in the charging duration does not change.

Since the input characteristic influences the charging duration and in turn the switching frequency, in a further embodiment, the controller is further adapted to tune the at least one of the first threshold and the second threshold according to an output characteristic of the ballast. This is a further feedforward solution that considers the input characteristic of the driver so as to make corresponding tuning in the hysteresis control. For example, in case a certain voltage range of the shunt switch is suitable for a high ballast output, this voltage range would result to lower switching frequency for a low ballast output. If the ballast output is lower than a certain level which causes audible noise, the tuning circuit can reduce the voltage range so the switching frequency is still high for this low ballast output. A detector at the input of the driver can be used for detecting the ballast output characteristic and inform the characteristic to the tuning circuit.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting driver, comprising:
a driver input adapted to receive an alternating current power supply from a fluorescent lighting ballast;
a shunt device connected to the driver input and adapted to selectively shunt the power supply;
a controller adapted to operate or not operate the shunt device;
wherein the controller is adapted to operate the shunt device during a portion of a cycle of the alternating current power supply, such that a current is delivered to a lighting load only during the portion of the cycle of the alternating current power supply when the shunt device is not operated; and
a zero crossing detector adapted to generate a detection signal and to provide the detection signal to the controller to operate the shunt device upon the detection signal, wherein said detection signal is a zero crossing detection signal,
wherein the zero crossing detector comprises:
a detection circuit adapted to analyze an input voltage at the driver input and generate the detection signal (ZCD) accordingly, when the input voltage is detected; and
a correction circuit adapted to generate the detection signal (ZCD) after a time delay from an end of operating the shunt device, even when said input voltage is not detected, wherein said correction circuit is adapted to start to time a time constant corresponding to the time delay at the end of operating the shunt device and to generate the detection signal (ZCD) after the time constant expires when said input voltage is not detected.

2. The lighting driver as claimed in claim 1, further comprising:
a rectifier having a rectifier input adapted to connect to the driver input and having a rectifier output adapted to drive the lighting load,
wherein the shunt device is either:
connected between the rectifier and the lighting load, adapted to selectively shunt the rectifier output; or
integrated with the rectifier and adapted to shunt the driver input,
and wherein said detection circuit comprises:
a pull on-off circuit adapted to:
pull off the detection signal when the controller operates the shunt device; and
pull off the detection signal when the input voltage at the driver input is low, and pull up the detection signal otherwise, when the controller does not operates the shunt device, and wherein the correction circuit is adapted to disable the pulling off of the pull on-off circuit after the controller stops from operating the shunt device, for the time delay.

3. The lighting driver as claimed in claim 1, wherein the detection circuit is connected to the driver input and adapted to:
  detect non-zero voltage values and a zero voltage value of the input voltage; and
  determine a zero crossing of the input voltage at the driver input upon a detection of the zero voltage value as the zero crossing detection signal after the non-zero voltage value, and generating the detection signal (ZCD) when the non-zero voltage value is detected.

4. The lighting driver as claimed in claim 2, wherein the detection circuit further comprises an interface circuit to the input voltage, and the pull on-off circuit comprises:
  a first pull off transistor associated with the interface circuit, wherein said first pull off transistor is adapted to enable the detection signal to be pulled on when the detected input voltage at the driver input is non-zero, and adapted to enable the detection signal to be pulled off when the detected input voltage at the driver input is zero.

5. The lighting driver as claimed in claim 4, wherein the controller is adapted to generate a bi-state shunt control signal to control the shunt device, and the pull on-off circuit further comprises:
  a second pull off transistor, adapted to be controlled by the shunt control signal so as to pull off the detection signal (ZCD) when the shunt control signal operates the shunt device, and not to pull off the detection signal (ZCD) when the shunt control signal is not operating the shunt device.

6. The lighting driver as claimed in claim 5, wherein the correction circuit is adapted to be controlled by the shunt control signal so as to enable the detection signal to be pulled on when the shunt control signal does not operate and hence when the second pull off transistor is not pulling off the detection signal, for the time delay.

7. The lighting driver as claimed in claim 6, wherein the first pull off transistor comprises:
  a base terminal connected to a bias voltage and to the interface circuit;
  a collector terminal connected to a bias voltage; and
  an emitter terminal connected to a reference voltage (GND),
  and wherein the second pull off transistor comprises:
  a base terminal connected to the shunt control signal;
  a collector terminal connected to the collector terminal of the first pull off transistor; and
  an emitter terminal connected to the reference voltage (GND).

8. The lighting driver as claimed in claim 7, wherein the interface circuit comprises:
  a control transistor which is turned on by an input voltage at the driver input and which pulls off the bias voltage at the base terminal of the first pull off transistor when the control transistor is turned on.

9. The lighting driver as claimed in claim 7, wherein the correction circuit comprises:
  a delay circuit adapted to:
    pull off the bias voltage at the base terminal of the first pull off transistor when the shunt control signal does operate and up to said time delay after the end of the operation of the shunt control signal; and
    allow the bias voltage at the base terminal of the first pull off transistor to be pulled on after said time delay after the end of operating state of the shunt control signal.

10. The lighting driver as claimed in claim 9, wherein the delay circuit comprises a transistor with an RC circuit connected to the shunt control signal, adapted to allow the bias voltage at the base terminal of the first pull off transistor to be pulled on only after said time delay.

11. The lighting driver as claimed in claim 1, wherein the controller further comprises:
  a dimming interface adapted to receive a dimming level; and said controller is adapted to control a length of a duration of operating the shunt device according to said dimming level.

12. The lighting driver as claimed in claim 11, wherein the controller further comprises:
  a feedback loop adapted to detect the current going to the lighting load and to control the length of the duration of operating the shunt device according to said diming level and said detected current, and
  the driver input is adapted to receive a power supply from an electronic high frequency fluorescent lighting ballast.

13. A lighting device comprising:
  the lighting driver as claimed in claim 1; and
  an LED lighting load to be driven by said lighting driver.

14. A lighting device as claimed in claim 11, wherein the lighting load is a tubular LED lamp.

15. A method of controlling a lighting load, comprising:
  receiving an alternating current power supply from a fluorescent lighting ballast;
  controlling a shunt device for selectively shunting the power supply thereby to implement dimming control, by operating the shunt device and not operating the shunt device;
  operating the shunt device during a portion of a cycle of the alternating current power supply, such that a current is delivered to the lighting load only during the portion of the cycle of the alternating current power supply when the shunt device is not operated; and
  generating a detection signal and providing a detection feedback signal to a controller to start to operate the shunt device,
  wherein the method further comprises:
  analyzing an input voltage at a driver input and generating the detection signal accordingly, when the input voltage is detected; and
  generating the detection signal after a time delay from an end of operating the shunt device even when said input voltage is not detected, comprising starting to time a time constant corresponding to the time delay at the end of operating the shunt device and generating the detection signal (ZCD) after the time constant expires when said input voltage is not detected.

* * * * *